US012304031B1

(12) United States Patent
Skiba et al.

(10) Patent No.: US 12,304,031 B1
(45) Date of Patent: May 20, 2025

(54) CRIMPING MECHANISM FOR LOCKING PINS

(71) Applicant: Toyota Motor Engineering & Manufacturing North America, Inc., Plano, TX (US)

(72) Inventors: Marek Skiba, London (CA); Joshua R. McLarty, London (CA); Hassan A. Rizk, London (CA)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/658,415

(22) Filed: May 8, 2024

(51) Int. Cl.
*B25B 21/00* (2006.01)
*B25B 27/08* (2006.01)
*B25B 27/20* (2006.01)

(52) U.S. Cl.
CPC .................................. *B25B 21/001* (2013.01)

(58) Field of Classification Search
CPC ....... B25B 21/001; B25B 27/08; B25B 27/20; Y10T 29/53709; H01R 43/0427
USPC ............................................................ 72/102
See application file for complete search history.

(56) References Cited

U.S. PATENT DOCUMENTS

| | | | | | |
|---|---|---|---|---|---|
| 1,302,287 | A * | 4/1919 | Beag | B25B 27/08 | 29/247 |
| 2,821,100 | A * | 1/1958 | Decker | B25B 27/08 | 72/383 |
| 2,854,874 | A * | 10/1958 | Decker | B25B 27/08 | 29/243.5 |
| 3,153,357 | A * | 10/1964 | Decker | B25B 27/08 | 81/304 |
| 3,555,940 | A * | 1/1971 | Cooper | B23B 5/02 | 82/112 |
| 3,638,472 | A | 2/1972 | Orloff et al. | | |
| 4,627,142 | A | 12/1986 | Hornak | | |
| 4,720,898 | A * | 1/1988 | Calfo | G21C 7/08 | 976/DIG. 118 |
| 4,774,762 | A * | 10/1988 | Gobeil | B25B 27/146 | 29/751 |
| 4,835,855 | A * | 6/1989 | Eaton | H01R 43/04 | 29/748 |
| 5,088,972 | A | 2/1992 | Parker | | |
| 5,588,320 | A | 12/1996 | Lallier | | |
| 9,724,809 | B2 * | 8/2017 | Jones | F16B 21/12 | |
| 2005/0286989 | A1 * | 12/2005 | Ackley | B25B 21/001 | 411/284 |
| 2008/0276678 | A1 * | 11/2008 | Pacaud | B25B 27/146 | 72/21.4 |
| 2014/0260097 | A1 * | 9/2014 | Avery | A61F 2/9524 | 72/367.1 |
| 2016/0167209 | A1 * | 6/2016 | Jones | F16B 21/12 | 29/525.05 |

(Continued)

*Primary Examiner* — Lawrence Averick
(74) *Attorney, Agent, or Firm* — Christopher G. Darrow; Darrow Mustafa PC

(57) ABSTRACT

A crimping mechanism includes an actuator having a reciprocating element and a crimping element attached to the reciprocating element. The actuator is positionable with respect to a fastener and a pin mounted on a sub-assembly so that the crimping element is movable in a direction toward the fastener so as to produce a first crimp in an associated first portion of the pin by bending the first portion of the pin along a first portion of the fastener.

10 Claims, 6 Drawing Sheets

(56) References Cited

U.S. PATENT DOCUMENTS

| | | | | |
|---|---|---|---|---|
| 2017/0317461 | A1* | 11/2017 | Wason | B25B 27/10 |
| 2018/0169806 | A1* | 6/2018 | Dorie | B25B 27/20 |
| 2018/0333833 | A1* | 11/2018 | Obesser | B25B 27/08 |

* cited by examiner

CRIMPING MECHANISM FOR LOCKING PINS

TECHNICAL FIELD

The present invention relates to crimping tools and, more particularly, to a crimping mechanism used for forming one or more crimps in a locking pin used to secure mated fasteners in the mated condition.

BACKGROUND

Locking pins such as cotter pins may be used to secure fasteners in place with respect to each other, for example, in an assembly used in a high-vibration environment or another environment where the fasteners may become detached or separated from each other. One method of securing the locking pin in place is to form one or more crimps in in the pin after it has been inserted into a desired locking position. Manually-actuated crimping tools exist to enable formation of the desired crimp(s). Frequently, however, due to the sizes of the components being connected and the geometry of the assembly at the contact interfaces between the components, manual operation of the crimping tools may be ergonomically demanding and physically exhausting, making it difficult to form a manual crimp that satisfies engineering specifications. This can lead to increased scrap production, operator fatigue, and wasted assembly time.

SUMMARY

In one aspect of the embodiments described herein, a crimping mechanism includes an actuator having a reciprocating element and a crimping element attached to the reciprocating element. The actuator is structured to be positionable with respect to a fastener and a pin mounted on a sub-assembly so that the crimping element is movable in a direction toward the fastener so as to produce a first crimp in an associated first portion of the pin by bending the first portion of the pin along a first portion of the fastener.

BRIEF DESCRIPTION OF THE DRAWINGS

The accompanying drawings, which are incorporated in and constitute a part of the specification, illustrate various systems, methods, and other embodiments of the disclosure. In some embodiments, one element may be designed as multiple elements or multiple elements may be designed as one element. In some embodiments, an element shown as an internal component of another element may be implemented as an external component and vice versa. Furthermore, elements may not be drawn to scale. Also, unless otherwise stated or shown, the same or similar elements shown in different views may be given the same or similar reference numerals or designations.

DETAILED DESCRIPTION

A crimping mechanism includes an actuator having a reciprocating element and a crimping element attached to the reciprocating element. The actuator is positionable with respect to a fastener and a locking pin mounted on a sub-assembly so that the crimping element is movable in a direction toward the fastener so as to produce a first crimp in an associated first portion of the pin by bending the first portion of the pin along a first portion of the fastener.

Figure 1:
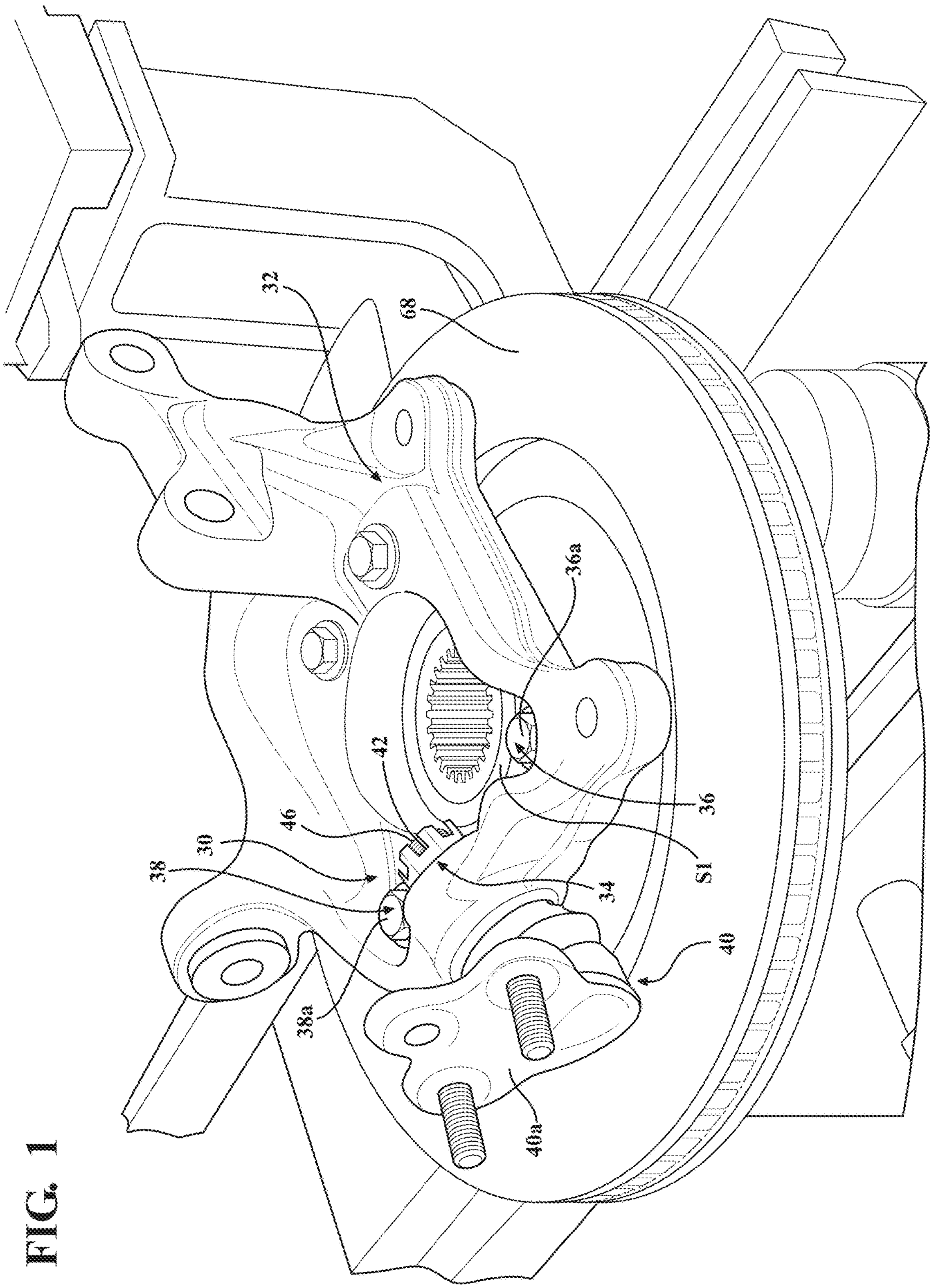
FIG. 1 is a schematic perspective view of a vehicle brake caliper sub-assembly in accordance with an embodiment described herein, shown positioned on a work base.

FIG. 1 is a schematic perspective view of a vehicle brake caliper sub-assembly 30 in accordance with an embodiment described herein. Sub-assembly 30 may form part of a larger vehicle brake caliper assembly (not shown) resulting from the attachment of additional components to the sub-assembly 30 in subsequent fabrication steps.

Sub-assembly 30 may include a knuckle 32. In one or more arrangements, knuckle 32 may be cast and/or machined from steel, aluminum, or any other suitable material. FIG. 1 shows a knuckle 32 formed from steel. Knuckle 32 may have a hole 34 formed therein. Hole 34 may be structured for receiving therein a projection 42 of a ball joint 40 (described in greater detail below) of the vehicle brake caliper sub-assembly 30.

A bolt 36 may be inserted through another hole formed in the knuckle 32. Another bolt 38 may be inserted through yet another hole formed in the knuckle 32 and spaced apart from the hole receiving the bolt 36. knuckle 32 and bolts 36 and 38 may be structured so that respective heads **36*a*, 38*a* of the bolts 36, 38 project in an upward direction from a surface S1 of the knuckle 32 when the vehicle brake caliper sub-assembly 30 is positioned on a work base 68 (described in greater detail below) for a crimping operation. Respective shanks of the bolts 36 and 38 may extend from side S1 through the knuckle 32** to a side of the knuckle opposite side S1, for attachment to other components of the vehicle brake caliper assembly or to a vehicle in which the vehicle brake caliper assembly is installed.

Ball joint 40 may include a base portion **40*a* and a projection 42 extending from the base portion 40*a*. The projection 42 may be structured to be insertable through hole 34 in knuckle 32 to enable attachment of the ball joint 40 to the knuckle 32. In arrangements described herein, the projection 42** may be in the form of a threaded stud. However, other types of projections (such as non-threaded projections) may be used.

Figure 3A:
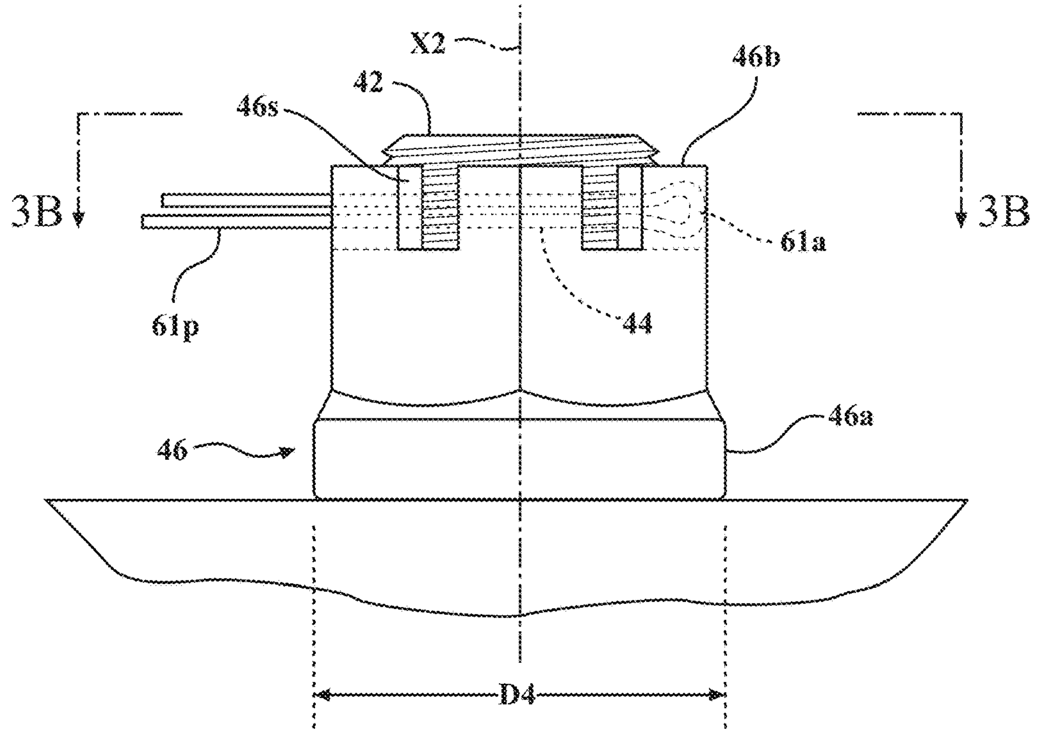
FIG. 3A is a schematic side view of a fastener in the form of a castle nut applied to a ball joint projection in accordance with an embodiment described herein, showing insertion of a pin through the projection and opposed slots of the castle nut.
Figure 3B:
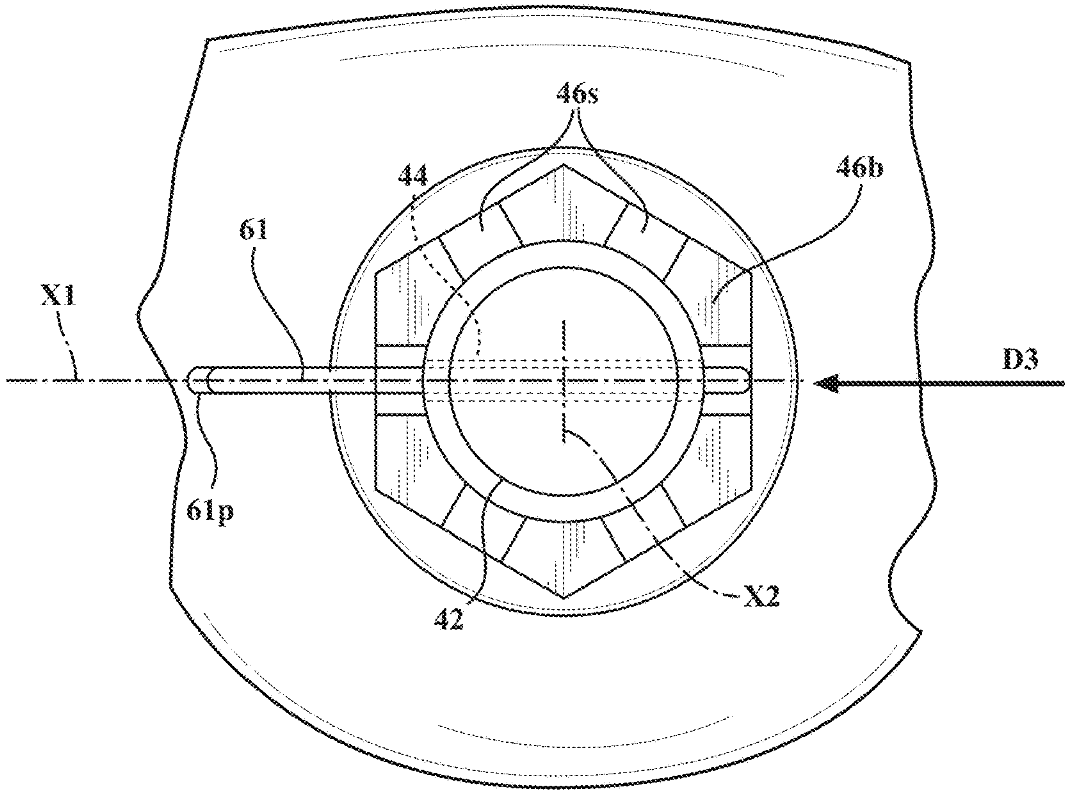
FIG. 3B is a schematic plan view of the projection, fastener, and pin shown in FIG. 3A.

Referring to FIGS. 3A and 3B, threaded stud 42 may have a through hole 44 extending therethrough. In one or more arrangements, the threaded stud 42 may be cylindrical and threaded stud hole 44 may be a diametral hole (i.e., a hole extending along a diameter of the threaded stud 42). referring to FIG. 4, in one or more arrangements, the knuckle 32 and the ball joint 40 may be structured so that a central axis X2 of the threaded stud 42 extends through the knuckle hole 34 at an angle ⊖ with respect to a horizontal plane H1 when the sub-assembly 30 is positioned and oriented in the work base 68 for crimping operations.

Referring to FIGS. 1 and 3A-3B, a fastener may be applied to the threaded stud 42 after the threaded stud 42 has been inserted into the knuckle hole 34, to attach the ball joint 40 to the knuckle 32. As used herein, "attach" means to connect or couple one component to another component (e.g., the ball joint 40 and the knuckle 32) so that the two components move together. In arrangements described herein, the fastener may be a castle nut or crown nut 46 that is internally threaded for threadedly engaging complementary threads formed along an exterior of ball joint stud 42. For purposes described herein, the terms "castle nut" and "crown nut" will be used interchangeably to refer to the same element. Other types of fasteners may also be used.

Referring to FIGS. 3A and 3B, in one or more arrangements, the castle nut 46 may include a body portion 46*b* having multiple intersecting flat sides. The castle nut embodiment shown in FIGS. 3A and 3B has a hexagonal body portion 46*b*. Each of the flat sides may have a slot 46*s* formed therein. referring to FIG. 3B, slots 46*s* formed along diametrically opposite flat sides of the body portion 46*b* may be arranged to align with each other along an associated axis X1 extending through a central axis X2 of the castle nut 46.

In addition, when applied to the threaded stud 42, the castle nut 46 may be rotatable so as to enable alignment of a pair of opposed slots 46*s* with hole 44 formed in stud 42 so that a pin 61 may be inserted in direction D3 into a slot 46*s*, then through hole 44, then through an opposite slot 46*s* as shown in FIG. 3B, with a portion 61*p* of the pin to be crimped extending exterior of the castle nut 46. The pin 61 may then be crimped using the crimping mechanism 66 described in greater detail below.

Figure 5:
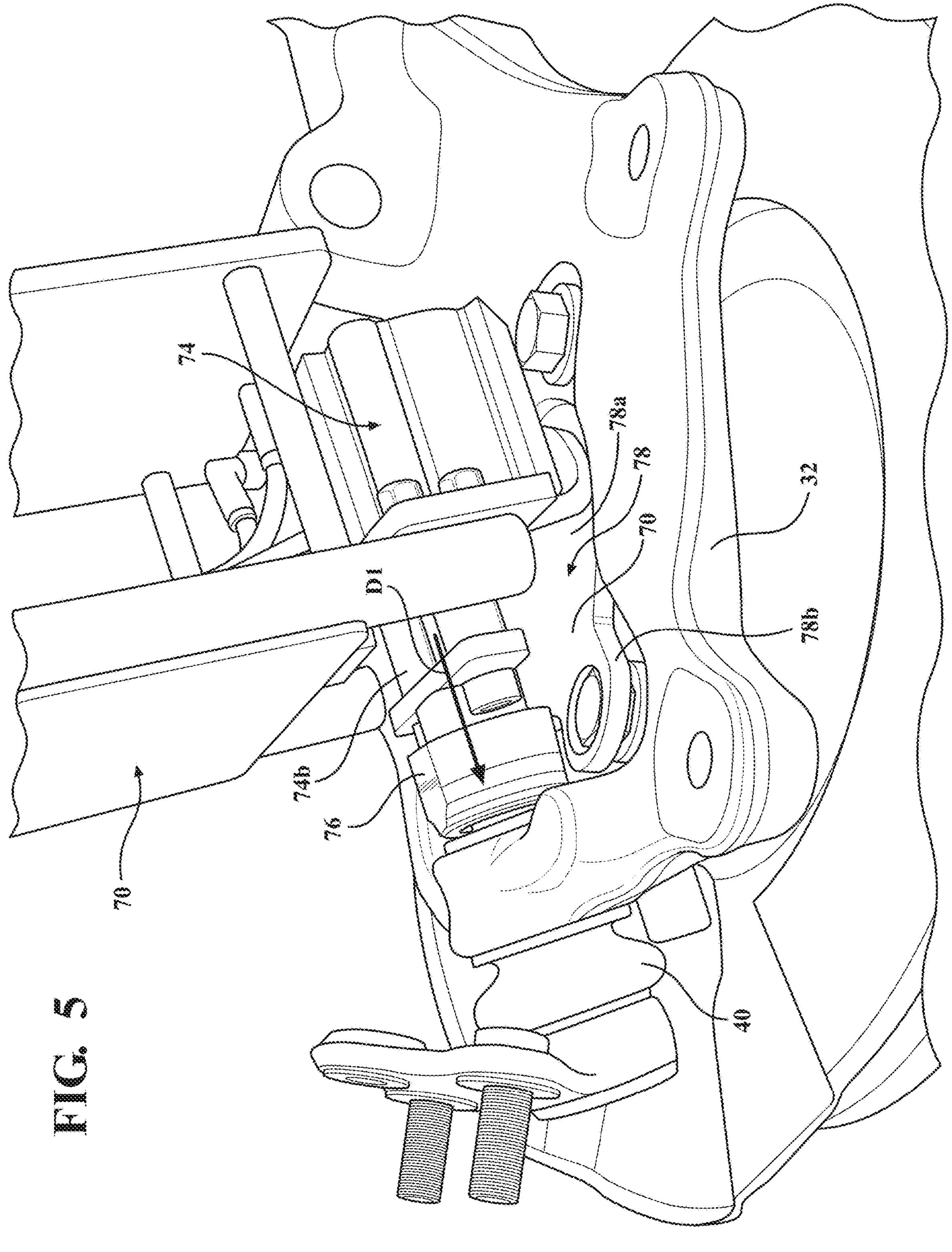
FIG. 5 is the schematic perspective view of FIG. 4, showing movement of a crimping element to enclose a portion of the projection and fastener during performance of a crimping operation on the pin, to produce either a single or a double crimp in the pin.
Figure 5A:
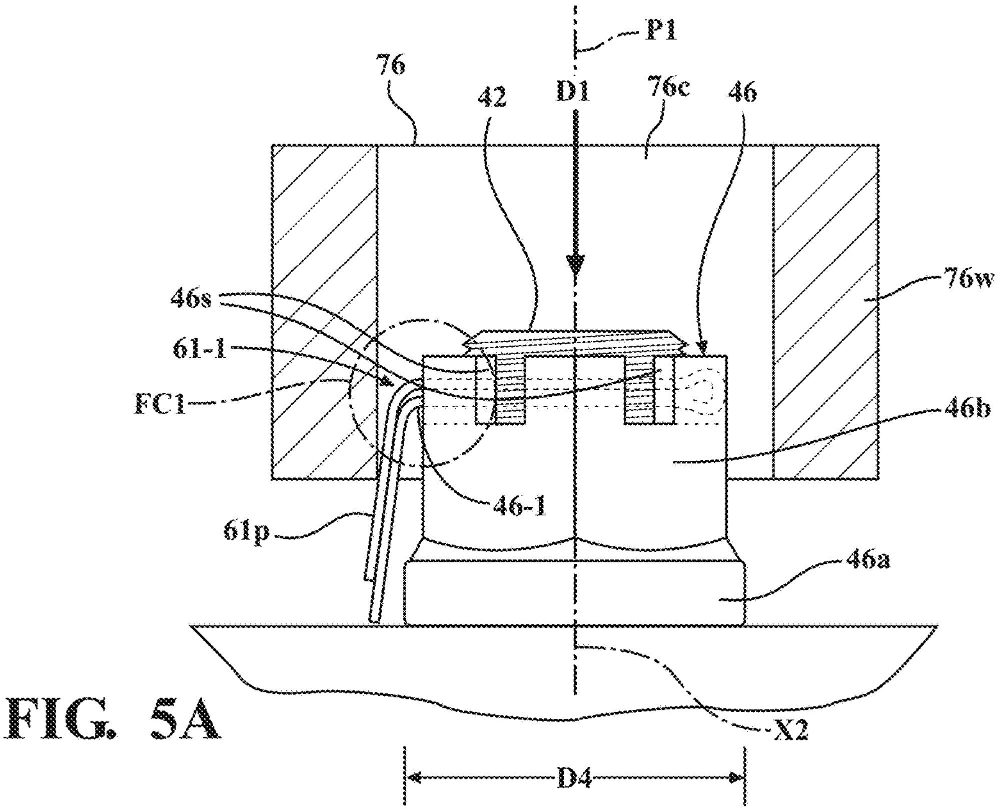
FIG. 5A is a schematic partial cross-sectional side view of the ball joint projection and a first embodiment of the fastener in the form of a castle nut, as the crimping element moves to enclose portions of the ball joint projection and the fastener during a crimping operation, to produce a single crimp in the pin.

Referring to FIGS. 3A, 3B, and 5A, the castle nut 46 may also include a base portion 46*a* structured to bear against the knuckle 32 when the castle nut is applied to the stud 42. referring in particular to FIG. 5A, for application to a steel knuckle, the base portion 46*a* may have a relatively smaller diameter D4 structured to facilitate formation of a single crimp in a pin 61 extending through the stud 42 when the crimping mechanism is operated as described herein.

Figure 5B:
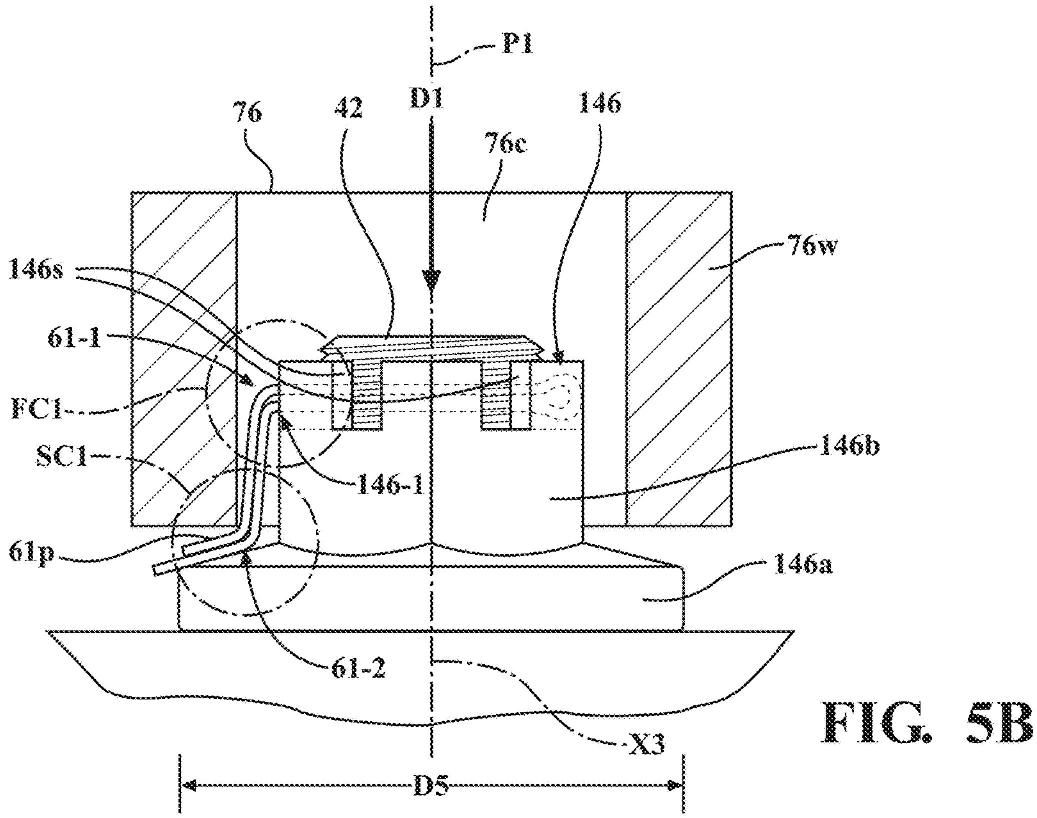
FIG. 5B is a schematic partial cross-sectional side view of the projection and a second embodiment of the fastener in the form of another, different castle nut, as the crimping element moves to enclose portions of the projection and the fastener during a crimping operation, to produce a double crimp in the pin.

Referring to FIG. 5B, in another version 146 of the castle nut structured to be applied to an aluminum knuckle, the castle nut 146 may include a body portion 146*b* having multiple intersecting flat sides. The castle nut embodiment shown in FIG. 5B has a hexagonal body portion 146*b*. Each of the flat sides may have a slot 146*s* formed therein. In an arrangement similar to that shown in FIG. 3B for castle nut 46, slots 146*s* formed along diametrically opposite flat sides of the body portion 146*b* may be arranged to align with each other along an associated axis X1 extending through a central axis X3 of the castle nut 146. The body portion 146*a* may have a relatively larger diameter D5 structured to facilitate formation of two crimps in the pin 61 from a single crimping motion when the crimping mechanism is operated as described herein. The castle nut 146 may also include a body portion 146*b* structured the same as body portion 46*b* previously described.

Referring again to FIGS. 3A and 3B, as previously described, pin 61 may be structured to have an portion 61*p* that is insertable into a castle nut slot 46*s* along one side of the castle nut 46, through the hole 44 formed in threaded stud/stud 42, and out of the castle nut 46 through a slot 46*s* on an opposite side of the castle nut 46. An opposite end 61*a* of the pin 61 may be structured to prevent the pin end from entering the hole 44 formed in threaded stud/stud 42. To this end, in one or more arrangements, the pin 61 may be a cotter pin or similar pin having a bulbous end dimensioned to prevent the pin opposite end 61*a* from passing into the hole 44. As used herein, the term "crimp" means deforming a portion of the pin 61 so that it becomes wavy, bent, or pinched. Similarly, a crimped pin having a portion deformed so as to be is wavy, bent, or pinched relative to its original shape. Thus, when the pin structure described passed through the castle nut and stud and crimped at the along portion 61*p*, the pin 61 will be prevented from exiting the stud hole 44. Also, as end portions of the pin 61 extend into the slots 46*s* formed in opposite flat sides of the castle nut 46, the castle nut 46 will be prevented from rotating relative to the stud 42 and separating from the stud.

Figure 2:
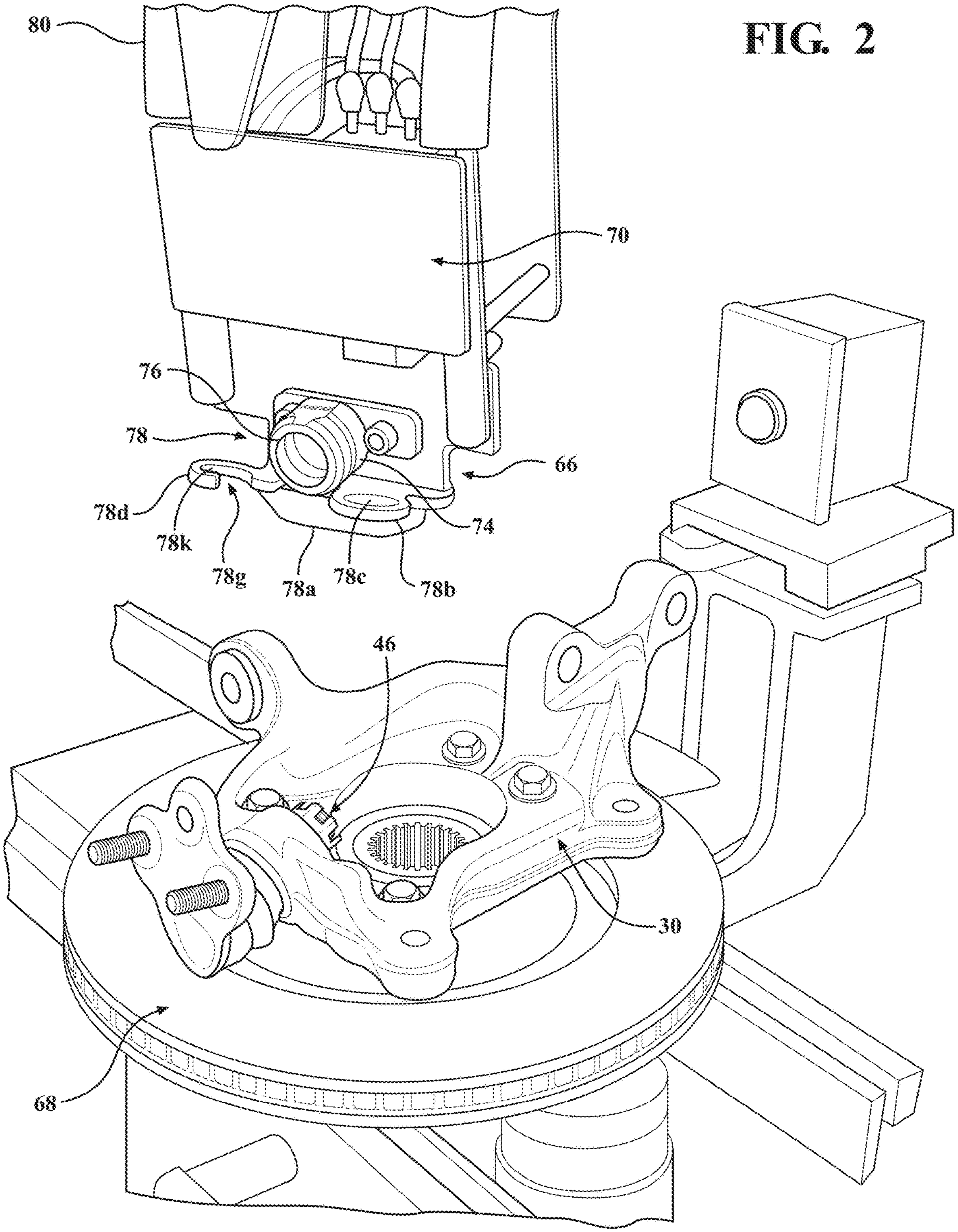
FIG. 2 is a schematic perspective view of a vehicle brake caliper sub-assembly in accordance with an embodiment described herein positioned in a crimping mechanism in accordance with an embodiment described herein, for performance of a crimping operation on the sub-assembly.

FIG. 2 is a schematic perspective view of a crimping mechanism 66 in accordance with an embodiment described herein. The crimping mechanism 66 is structured to crimp the pin 61 extending through portions of the castle nut 46 and ball joint stud 42 as previously described, to prevent separation of the castle nut 46 from the stud 42 during operation of the vehicle brake caliper sub-assembly in a vehicle. This prevents separation of ball joint 40 from the knuckle 32.

The crimping mechanism 66 may include a work base 68. The work base 68 may include features tailored to a particular vehicle brake caliper sub-assembly, for positioning and securing the vehicle brake caliper sub-assembly in a predetermined location and orientation during crimping operations.

The crimping mechanism 66 may include a support frame 70 structured to support elements of the crimping mechanism such as the actuator 74, crimping element 76, and positioning element 78 (described in greater detail below), as well as crimping mechanism control elements, portions of any pressurized air supply lines, hydraulic fluid lines, etc. required for functioning of the actuator, and other elements.

The support frame 70 may support an actuator 74 structured and operable to reciprocatingly move a crimping element 76 (described in greater detail below) to perform crimping operations as described herein. In one or more arrangements, the actuator 74 may include one or more cylinders (such as pneumatic or hydraulic cylinder(s)) incorporating associated pistons as reciprocating elements 74*b*.

Figure 4:
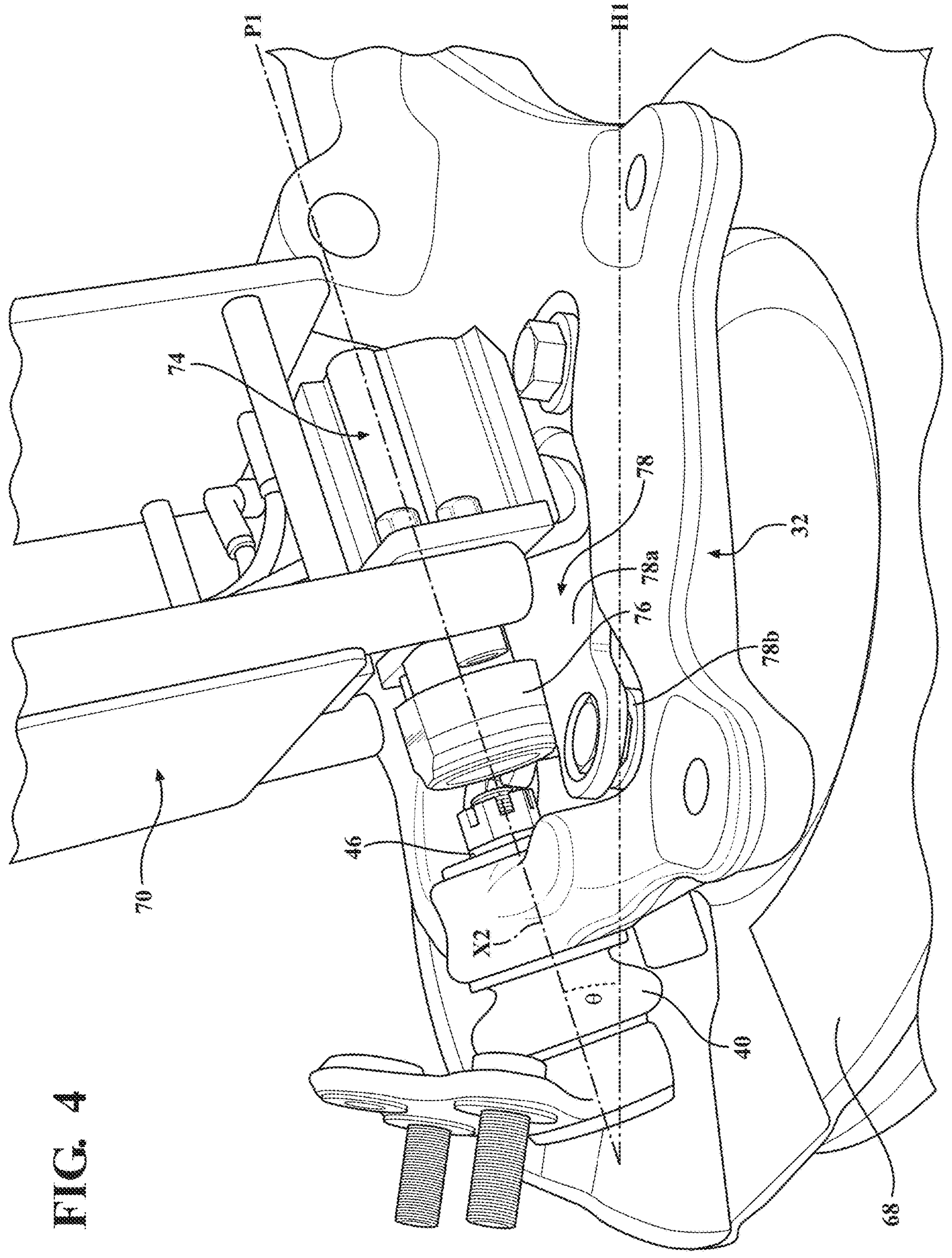
FIG. 4 is a schematic perspective view of the crimping mechanism and vehicle brake caliper sub-assembly of FIG. 2, shown prior to actuation of the crimping mechanism to perform a crimping operation on the pin.

Referring to FIGS. 4 and 5, the actuator 74 may be structured and fixedly oriented on the support frame 70 to support the crimping element 76 so that a central axis P1 of the crimping element 76 is coaxial with the central axis X2 of the threaded stud 42 and castle nut 46 to a degree wherein portions of the castle nut 46 and threaded stud 42 are received in the crimping element cavity 76*c* when the crimping mechanism 66 is actuated to move the crimping element 76 in direction D1 toward the castle nut 46. The actuator 74 may operable to reciprocatingly move the crimping element 76 toward and away from the threaded stud 42 and castle nut 46 responsive to control commands produced by manual operation of one or more associated buttons or switches (not shown).

Referring to FIGS. 4 and 5, crimping element 76 may be attached to the reciprocating actuator element(s) 74*b* using an interference fit, castle nuts, or any other suitable means. The crimping element 76 may be structured to crimp the pin when moved by the actuator 74 in a direction toward the castle nut 46 the stud 42.

Referring to FIG. 5A, in one or more arrangements, crimping element 76 may be in the form of a cylindrical sleeve including an annular outer wall 76*w* defining a cavity 76*c* extending therethrough. This embodiment of the crimping element may have a central axis P1 extending through the cavity 76*c*.

Referring to FIGS. 2, 4, and 5, an actuator positioning element 78 may be attached to a lower portion of the actuator 74. The positioning element 78 may be formed from a steel plate or from any other suitable material. The positioning element 78 may include a base portion 78*a* structured to be attachable to the lower portion of actuator 74.

A first positioning ear 78*b* may extend from the base portion 78*a*. The first positioning ear 78*b* may be structured to engage a head 36*a* of first bolt 36 which projects from knuckle surface 32*s* when the vehicle brake caliper sub-assembly 30 is positioned on the work base 68 for a crimping operation. first positioning ear 78*b* may define a cavity 78*c* dimensioned to receive bolt head 36*a* therein in a close sliding fit, to help position and secure the support frame 70 and its attached elements with respect to the threaded stud 42 and the castle nut 46.

A second positioning ear 78*d* may also extend from the base portion 78*a*. The second positioning ear 78*d* may be structured to engage a head 38*a* of second bolt 38 which projects from knuckle surface 32*s* when the vehicle brake caliper sub-assembly 30 is positioned on the work base 68 for a crimping operation. second positioning ear 78*d* may define a define cavity 78*k* dimensioned to receive bolt head 38*a* therein in a close sliding fit, to help position and secure the support frame 70 and its attached elements with respect to the threaded stud 42 and the castle nut 46. the second positioning ear 78*d* may include a gap 78*g* formed along an edge thereof and structured to allow a portion of the pin 61 to prevent the second positioning ear from moving the and/or interfering with movement of portions of the pin to be crimped, prior to and during the crimping operation.

Referring to FIG. 2, the crimping mechanism 66 may be supported for ease of manual movement by a known tool balancing mechanism 80 coupled to the support frame 70 and structured to support most of the weight of the crimping mechanism 66.

Referring to FIGS. 4-5B, embodiments of the crimping mechanism described herein may be structured to produce one or more crimps in portions of the pin 61 extending through the threaded stud 42 and castle nut 46 as previously described, by bending the one or more portion(s) of the pin 61 along associated portions of the castle nut 46.

For example, referring to FIG. 5A, the actuator 74 may be positionable with respect to the castle nut 46 and the pin 61 so that the crimping element 76 is movable in a direction D1 toward the castle nut 46 so as to produce a first crimp FC1 in an associated first portion 61-1 of the pin by bending a first portion of the pin along a first portion of the castle nut. FIG. 5A is a schematic cross-sectional side view of the ball joint threaded stud 42 and a first embodiment of the castle nut in the form of castle nut 46, as the crimping element 76 moves to enclose portions of the ball joint threaded stud 42 and the castle nut 46 during a crimping operation, to produce a single crimp in the pin 61. As portions of the stud 42 and the castle nut 46 are received in the cavity, the crimping element outer wall 76*w* deforms the pin 61 to produce the first crimp in the pin 61. In the embodiment shown, the first portion 61-1 of the pin 61 is bent along an edge 46-1 of a castle nut slot 46*s* to produce the first crimp FC1.

Alternatively, referring to FIG. 5B, the actuator 74 may be positionable with respect to the castle nut and the pin so that the crimping element 76 is movable in direction D1 toward the castle nut so as to produce the first crimp previously described in the first portion of the pin, and also to produce a second crimp in the pin by bending a second portion of the pin along a second portion of the castle nut. FIG. 5B is a schematic cross-sectional side view of the threaded stud 42 and a second embodiment 146 of the castle nut in the form of another, different castle nut, as the crimping element 76 moves in direction D1 to enclose portions of the threaded stud 42 and the castle nut 146 during a crimping operation, to produce a double crimp in the pin 61. As portions of the stud 42 and the castle nut 146 are received in the cavity, the crimping element outer wall 76*w* deforms the pin 61 to produce the first crimp in the pin 61. In the embodiment shown, the first portion 61-1 of the pin 61 is bent along an edge 146-1 of a castle nut slot 46*s* to produce the first crimp FC1. After portions of the stud 42 and the castle nut 146 are received in the cavity 76*c* and as the crimping element continues to move in direction D1, the crimping element outer wall 76*w* deforms the second portion 61-2 of the pin 61 (along an intersection between the castle nut base portion 146*a* and the castle nut body portion 146*b*) to produce the second crimp SC1 in the pin 61. In the embodiment shown, the second portion 61-2 of the pin 61 is bent along the castle nut base portion 146*a* to produce the second crimp SC1.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A crimping mechanism comprising:

an actuator; and a crimping element attached to the actuator, the actuator being structured to enable a central axis of the crimping element and a central axis of a fastener mounted on a sub-assembly spaced apart from the crimping element to be positioned along a common axis, so that the crimping element is movable along the common axis in a direction toward the fastener to produce a first crimp in an associated first portion of a pin extending through the fastener by bending the first portion of the pin along a first portion of the fastener, wherein the crimping element includes an annular outer wall defining a cavity structured to receive a portion of the fastener therein as the crimping element is moved along the common axis in the direction toward the fastener.

2. The crimping mechanism of claim 1, wherein the sub-assembly is a vehicle brake caliper sub-assembly including:

a knuckle having a hole formed therein; and a ball joint including a projection structured to be inserted through the hole, wherein the fastener is applied to the projection after the projection is inserted through the hole, to attach the ball joint to the knuckle.

3. The crimping mechanism of claim 2, wherein the fastener is a castle nut having a slot formed in each side thereof.

4. The crimping mechanism of claim 2, wherein the projection has a through hole extending therethrough, and wherein the pin extends through the through hole.

5. The crimping mechanism of claim 1, wherein the outer wall and the fastener are structured so that the first crimp in the pin is produced by the outer wall bending the pin as the portion of the fastener moves into in the cavity.

6. The crimping mechanism of claim 5, wherein the outer wall and the fastener are structured so that the crimping element also causes a second crimp in an associated second portion of the pin by bending the second portion of the pin along a second portion of the fastener as portions of the projection and the fastener are received in the cavity as the crimping element is moved along the common axis in the direction toward the fastener.

7. The crimping mechanism of claim 1, further comprising an actuator positioning element attached to the actuator, the actuator positioning element including a positioning ear structured to engage a portion of the sub-assembly when the central axis of the crimping element and the central axis of the fastener are positioned along the common axis.

8. The crimping mechanism of claim 7, wherein the positioning ear includes a gap formed along an edge thereof and structured to allow a portion of the pin to extend therein during bending of the pin by the crimping element.

9. The crimping mechanism of claim 7, further comprising another positioning ear structured to engage another portion of the sub-assembly when the central axis of the crimping element and the central axis of the fastener are positioned along the common axis.

10. The crimping mechanism of claim 9, further comprising a work base structured to position and secure the vehicle brake caliper sub-assembly in a predetermined location and orientation during crimping operations, wherein the knuckle includes a pair of bolts having bolt heads that engage the positioning ear and the other positioning ear when the vehicle brake caliper sub-assembly is positioned on the work base for a crimping operation.

* * * * *